United States Patent
Wong et al.

(10) Patent No.: US 11,944,140 B2
(45) Date of Patent: Apr. 2, 2024

(54) GLOVE

(71) Applicant: Top Glove International Sdn. Bhd., Klang (MY)

(72) Inventors: Chong Ban Wong, Klang (MY); Vidhyaa Paroo Indran, Klang (MY); Nor Azlan Zulkifly, Klang (MY)

(73) Assignee: Top Glove International Sdn. Bhd., Klang (MY)

( * ) Notice: Subject to any disclaimer, the term of this patent is extended or adjusted under 35 U.S.C. 154(b) by 164 days.

(21) Appl. No.: 17/463,944

(22) Filed: Sep. 1, 2021

(65) Prior Publication Data

US 2022/0061432 A1 Mar. 3, 2022

(30) Foreign Application Priority Data

Sep. 2, 2020 (MY) ................ 2020004523

(51) Int. Cl.
*A41D 19/00* (2006.01)
*C08K 3/013* (2018.01)
*C08K 3/22* (2006.01)

(52) U.S. Cl.
CPC ..... *A41D 19/0082* (2013.01); *A41D 19/0006* (2013.01); *C08K 3/013* (2018.01); *C08K 3/22* (2013.01); *C08K 2003/2275* (2013.01); *C08K 2201/01* (2013.01)

(58) Field of Classification Search
CPC ... C08K 2201/01; C08K 3/22; A41D 19/0082
See application file for complete search history.

(56) References Cited

U.S. PATENT DOCUMENTS

| | | | | |
|---|---|---|---|---|
| 5,922,482 A | * | 7/1999 | De Ricci | G08B 13/2408 2/167 |
| 2016/0150840 A1 | * | 6/2016 | Enomoto | C08L 13/00 523/334 |
| 2020/0199311 A1 | | 6/2020 | Foo et al. | |

FOREIGN PATENT DOCUMENTS

| | | | | |
|---|---|---|---|---|
| EP | 3663332 A1 | * | 6/2020 | ............ C08J 5/02 |
| GB | 2372934 A | * | 9/2002 | ......... A41D 19/0055 |
| WO | 2017065599 A1 | | 4/2017 | |
| WO | 2021084335 A1 | | 5/2021 | |

OTHER PUBLICATIONS

Ong, et al., "Effect of Magnetic and Thermal Properties of Iron Oxide Nanoparticles (IONs) in Nitrile Butadiene Rubber (NBR) latex", Journal of Magnetism and Magnetic Materials, vol. 395, 2015, pp. 173-179.
European Search Report dated Jan. 31, 2022 for related Application EP 21194223.0.
Malaysian Search Report dated Apr. 16, 2023 for corresponding Application MY PI2020004523.

* cited by examiner

*Primary Examiner* — Brieann R Johnston
(74) *Attorney, Agent, or Firm* — Saul Ewing LLP; Domingos J. Silva; Chihao Wang

(57) ABSTRACT

A glove that is detectable by a metal detector. The glove is prepared from latex formulation including a metallic additive. The metallic additive includes a pigment, a surfactant and a solvent. The metallic additive is used in an amount of at least 10 phr based on an amount of a latex formulation.

7 Claims, No Drawings

GLOVE

CROSS-REFERENCE TO RELATED APPLICATIONS

The present application claims priority under 35 U.S.C. § 119(a) to Malaysia Patent Application No. PI2020004523, filed on Sep. 2, 2020, which is incorporated herein by reference in its entirety.

BACKGROUND

Use of gloves is essential in food and beverages industry for maintaining hygiene while handling food and beverages related products. However, there is a possibility that fragmented pieces of glove may mix into the food and beverages while they are being processed.

Food contamination has been a major concern in the food and beverages industry. Thus, even a fragment or a torn piece of glove being mixed in these products can contribute to contamination in these products.

Therefore, there is a need to develop glove that, if parts thereof are mixed into food or beverages, can be easily detected. The instant specification addresses this need.

SUMMARY

The present invention relates in some aspects to a glove. In certain embodiments, the glove contemplated herein is detectable by a metal detector.

In some embodiments, the instant specification is directed to a glove that is detectable by a metal detector, wherein the glove is prepared from a latex formulation including a metallic additive, wherein the metallic additive includes a pigment, a surfactant and a solvent, and wherein the metallic additive is used in an amount of at least 10 phr of the latex formulation.

In some embodiments, the instant specification is directed to the following embodiments:

Embodiment 1 provides a glove that is detectable by a metal detector, wherein the glove is prepared from latex formulation comprising a base polymer, a pH adjuster, an accelerator, a vulcanizing agent, a thickener, an antitack agent, a whitening agent, a stabilizer, an antifoaming agent, an antioxidant, a dispersing agent, a filler, a black pigment, a surfactant and water, characterized in that the latex formulation further includes metallic additive, wherein the metallic additive is comprising a pigment, a surfactant and a solvent and wherein the metallic additive is used in an amount of at least 10 phr of the latex formulation and wherein the metallic additive has total solid content ranging between 10% to 30%.

Embodiment 2 provides the glove of embodiment 1, wherein the base polymer is selected from the group consisting of natural rubber, acrylonitrile butadiene rubber and mixture of acrylonitrile butadiene rubber and polychloroprene rubber.

Embodiment 3 provides the glove of embodiment 1, wherein the pH adjuster is selected from the group consisting of potassium hydroxide, sodium hydroxide, ammonia and mixtures thereof.

Embodiment 4 provides the glove of embodiment 1, wherein the pH adjuster is used in an amount ranging between 0.10 phr to 4.00 phr.

Embodiment 5 provides the glove of embodiment 1, wherein the accelerator is selected from the group consisting of zinc diethyldithiocarbamate, zinc dibenzyldithiocarbamate, zinc dibutyldithiocarbamate, zinc mercaptobenzothiazole and mixtures thereof.

Embodiment 6 provides the glove of embodiment 1, wherein the accelerator is used in an amount ranging between 0.10 phr to 2.00 phr.

Embodiment 7 provides the glove of embodiment 1, wherein the vulcanizing agent is selected from the group consisting of zinc oxide, sulphur and mixtures thereof.

Embodiment 8 provides the glove of embodiment 1, wherein the vulcanizing agent is used in an amount ranging between 0.30 phr to 4.00 phr.

Embodiment 9 provides the glove of embodiment 1, wherein the thickener is selected from the group consisting of ammonium polyacrylate, polysaccharides based thickener and mixtures thereof.

Embodiment 10 provides the glove of embodiment 1, wherein the thickener is used in an amount ranging between 0.05 phr to 0.50 phr.

Embodiment 11 provides the glove of embodiment 1, wherein the antitack agent is selected from the group consisting of paraffin wax, propylene glycol, anionic polyethylene wax emulsion and mixtures thereof.

Embodiment 12 provides the glove of embodiment 1, wherein the antitack agent is used in an amount ranging between 0.10 phr to 2.00 phr.

Embodiment 13 provides the glove of embodiment 1, wherein the whitening agent is titanium dioxide.

Embodiment 14 provides the glove of embodiment 1, wherein the whitening agent is used in an amount ranging between 0.50 phr to 3.00 phr.

Embodiment 15 provides the glove of embodiment 1, wherein the stabilizer is selected from the group consisting of sodium dodecylbenzene sulphonate, potassium laurate, disodium n-octadecylsulfosuccinamate and mixtures thereof.

Embodiment 16 provides the glove of embodiment 1, wherein the stabilizer is used in an amount ranging between 0.10 phr to 1.00 phr.

Embodiment 17 provides the glove of embodiment 1, wherein the antifoaming agent is selected from the group consisting of silicone, silicone emulsion and mixtures thereof.

Embodiment 18 provides the glove of embodiment 1, wherein the antifoaming agent is used in an amount ranging between 0.01 phr to 0.30 phr.

Embodiment 19 provides the glove of embodiment 1, wherein the antioxidant is phenolic antioxidant.

Embodiment 20 provides the glove of embodiment 1, wherein the antioxidant is used in an amount ranging between 0.50 phr to 2.00 phr.

Embodiment 21, the glove of embodiment 1, wherein the dispersing agent is selected from the group consisting of sodium salt of an acrylic polymer, sodium naphthalene formaldehyde sulphonate, monosodium salt of sulfated methyl oleate and mixtures thereof.

Embodiment 22 provides the glove of embodiment 1, wherein the dispersing agent is used in an amount ranging between 0.10 phr to 2.00 phr.

Embodiment 23 provides the glove of embodiment 1, wherein the filler is selected from the group consisting of silicate, calcium carbonate and mixtures thereof.

Embodiment 24 provides the glove of embodiment 1, wherein the filler is used in an amount ranging between 1.00 phr to 56.00 phr.

Embodiment 25 provides the glove of embodiment 1, wherein the black pigment is inorganic pigment.

Embodiment 26 provides the glove of embodiment 1, wherein the black pigment is used in an amount ranging between 0.50 phr to 3.00 phr.

Embodiment 27 provides the glove of embodiment 1, wherein the surfactant is selected from the group consisting of sodium dodecylbenzene sulphonate, potassium laurate, monosodium salt of sulphated methyl oleate, sodium naphthalene formaldehyde sulphonate, disodium n-octadecylsulphosuccinamate, sodium polyacrylate, ammonium polyacrylate, glycerol and mixtures thereof.

Embodiment 28 provides the glove of embodiment 1, wherein the surfactant is used in an amount ranging between 0.10 phr to 1.00 phr.

Embodiment 29 provides the glove of embodiment 1, wherein the metallic additive is used in an amount ranging between 10.00 phr to 25.00 phr.

Embodiment 30 provides the glove of embodiment 1, wherein the pigment in the metallic additive is selected from the group consisting of iron oxide pigment, iron oxide pigment with water-based source, iron oxide pigment linked zinc and mixtures thereof.

Embodiment 31 provides the glove of embodiment 1, wherein the pigment in the metallic additive is used in an amount ranging between 20% to 60%, by weight of the metallic additive.

Embodiment 32 provides the glove of embodiment 1, wherein the surfactant in the metallic additive is selected from the group consisting of sodium dodecylbenzene sulphonate, potassium laurate, monosodium salt of sulphated methyl oleate, sodium naphthalene formaldehyde sulphonate, disodium n-octadecylsulphosuccinamate, sodium polyacrylate, ammonium polyacrylate, glycerol and mixtures thereof.

Embodiment 33 provides the glove of embodiment 1, wherein the surfactant in the metallic additive is used in an amount ranging between 20% to 60%, by weight of the metallic additive.

Embodiment 34 provides the glove of embodiment 1, wherein the solvent in the metallic additive is selected from the group consisting of tap water, distilled water and mixtures thereof.

Embodiment 35 provides the glove of embodiment 1, wherein the solvent in the metallic additive is used in an amount ranging between 10% to 30%, by weight of the metallic additive.

Additional aspects, features and advantages will become apparent to those skilled in the art upon consideration of the following detailed description of preferred embodiments.

DETAILED DESCRIPTION

Detailed description of embodiments is disclosed herein. It should be understood, however, that the embodiments are merely exemplary in nature, which may be embodied in various forms. Therefore, the details disclosed herein are not to be interpreted as limiting, but merely as the basis for the claims and for teaching one skilled in the art. The numerical data or ranges used in the specification are not to be construed as limiting.

Traditionally, visual inspections have been used as to identify contaminants in food and beverages. However, this detection method is time-consuming and less effective because a part of the contaminants can only be detected when the contaminants appear on visible surfaces of these products.

In order to overcome the aforementioned disadvantages of visual inspection, there have been attempts in the art for instance, to utilize metal detector as a tool to discover contaminants in these products. Thus, metal additive was incorporated into a glove formulation to enable the metal detector to identify glove pieces or fragments in these food and beverages related products.

However, it has been identified that, in order to improve the detectable characteristics of the glove, a substantial quantity of the metal additive is required in the formulation of this conventional metal detector-detectable glove which in turn adversely reduces the mechanical properties of the glove. Furthermore, if large metal additive particle is used in the glove formulation, it contributes to non-uniform dispersion which increases number of defects in gloves. A glove with non-uniform dispersion is undesirable as it leads to low glove quality and comfortability during usage.

Accordingly, the instant specification describes a glove and a method for manufacturing the glove using a formulation which comprises metal additive without compromising the mechanical properties and durability of the glove.

In some embodiments, the instant specification describes a glove which incorporates a metallic additive into a latex formulation thereof and a method of manufacturing the glove. In some embodiments, the metallic additive includes iron oxide pigment. In some embodiments, the glove as described herein is for use in food and beverages industry where there is a need to identify contamination of gloves in food and beverages related products before packaging processes are initiated. According to the embodiments, by incorporating the metallic additive which is iron oxide pigment into the latex formulation, torn pieces or fragments of the glove are detectable by a metal detector before the food and/or beverages are processed for packaging.

In some embodiments, the glove has multilayer films that are produced from a latex formulation containing metallic additive in at least one layer, wherein the metallic additive is used in an amount of at least 10 phr of the latex formulation and wherein the metallic additive has total solid content ranging between with 10% to 30%, such as 15%. It has been discovered that the low amount of metallic additive used is able to achieve good detectability and sensitivity of a metal detector without compromising the mechanical properties and durability of the glove.

In some embodiments, the glove has a thickness ranging from 0.01 mm to 1.0 mm at palm. In some embodiments, the glove has a thickness of 0.05 mm at palm. The metal detection method is greatly affected by sensitivity and magnetic field strength of metal detector. The glove as described herein achieves excellent metal detectability with minimum detectable thickness of 0.05 mm and a fragment of glove piece can be reliably detected at a size below 5 mm×5 mm that are comparable to the conventional glove that is detectable by a metal detector.

In some embodiments, the latex formulation used for the glove includes a base polymer, a pH adjuster, an accelerator, a vulcanizing agent, a thickener, an antitack agent, a whitening agent, a stabilizer, an antifoaming agent, an antioxidant, a dispersing agent, a filler, a black pigment, a surfactant, water and metallic additive, wherein the metallic additive is comprising a pigment, a surfactant and a solvent.

In some embodiments, the base polymer includes synthetic rubber, natural rubber (NR), acrylonitrile butadiene rubber (NBR), carboxylated NBR (X-NBR), polyisoprene (PI) rubber, polychloroprene rubber (CR), chlorinated polyethylene (PE) rubber and thermoplastic elastomer (TPE) and mixtures thereof, preferably acrylonitrile butadiene rubber (NBR) or hybrid of acrylonitrile butadiene rubber (NBR)/ polychloroprene rubber (CR), natural rubber (NR), or combinations thereof.

In some embodiments, the pH adjuster includes potassium hydroxide, sodium hydroxide, ammonia, or combinations thereof. In some embodiments, the pH adjuster includes potassium hydroxide, ammonia, or combination thereof.

In some embodiments, the accelerator includes zinc diethyldithiocarbamate (ZDEC), zinc dibenzyldithiocarbamate (ZBEC), zinc dibutyldithiocarbamate (ZDBC), zinc mercaptobenzothiazole (ZMBT) or combinations thereof. In some embodiments, the accelerator includes a mixture of ZDEC and ZDBC.

In some embodiments, the vulcanizing agent includes zinc oxide, sulphur, or combination thereof. In some embodiments, the vulcanizing agent includes a mixture of zinc oxide and sulphur.

In some embodiments, the thickener includes ammonium polyacrylate, polysaccharide based thickener, or combination thereof. In some embodiments, the thickener includes ammonium polyacrylate.

In some embodiments, the antitack agent includes paraffin wax, propylene glycol, anionic polyethylene wax emulsion or combinations thereof. In some embodiments, the thickener includes paraffin wax.

In some embodiments, the whitening agent is titanium dioxide.

In some embodiments, the stabilizer includes sodium dodecylbenzene sulphonate (SDBS), potassium laurate, disodium n-octadecylsulfosuccinamate, or combinations thereof. In some embodiments, the stabilizer includes SDBS or disodium n-octadecylsulfosuccinamate.

In some embodiments, the antifoaming agent includes silicone, silicone emulsion or combination thereof. In some embodiments, the antifoaming agent includes silicone or silicone emulsion.

In some embodiments, the antioxidant is a phenolic antioxidant.

In some embodiments, the dispersing agent includes sodium salt of an acrylic polymer, sodium naphthalene formaldehyde sulphonate, monosodium salt of sulfated methyl oleate or combinations thereof. In some embodiments, dispersing agent includes sodium salt of an acrylic polymer, sodium naphthalene formaldehyde sulphonate and monosodium salt of sulfated methyl oleate.

In some embodiments, the filler includes silicate, calcium carbonate or combination thereof. In some embodiments, filler includes silicate filler or mixtures of silicate filler.

In some embodiments, the black pigment which acts as black coloring agent is an inorganic pigment. In some embodiments, the inorganic pigments is obtained from inorganic metallic compounds and salts such as chromates, metallic oxide and sulphates.

In some embodiments, the surfactant includes sodium dodecylbenzene sulphonate (SDBS), potassium laurate, monosodium salt of sulphated methyl oleate, sodium naphthalene formaldehyde sulphonate, disodium n-octadecylsulphosuccinamate, sodium polyacrylate, ammonium polyacrylate, glycerol or combinations thereof. In some embodiments, the surfactant includes sodium naphthalene formaldehyde sulphonate.

In some embodiments, the metallic additive is in a dispersion form. In some embodiments, the dispersion has a viscosity (Brookfield DV S02 @ 100 rpm) ranging from 30 cP to 200 cP. In some embodiments, the dispersion has a viscosity ranging between 50 cP to 100 cP. Viscosity (Brookfield DV S02 @ 100 rpm) below lower limit of the range which is 30 cP has risk of migration to the glove surface and it is undesirable. In the same way, viscosity (Brookfield DV S02 @ 100 rpm) above upper limit of the range which is 200 cP is undesirable in which the flexibility of the glove is reduced. In some embodiments, iron oxide pigment is used as the metallic additive. Iron oxide pigment is sometimes desirable in terms of stability, safety and availability. Using iron oxide pigment often satisfies food sanitation laws and, as such, lessens concern in the food and beverages manufacturer. In some embodiments, the metallic additive is a black liquid dispersion of which will be fully dispersed or semi dispersed in the latex formulation.

In some embodiments, the pigment in the metallic additive includes iron oxide pigment, iron oxide pigment with water-based source, iron oxide pigment linked zinc or combinations thereof. In some embodiments, the pigment in the metallic additive is iron oxide pigment. In some embodiments, the pigment is used in an amount ranging from 20% to 60% by weight of the metallic additive. In some embodiments, the pigment is used in an amount ranging from 30% to 50% by weight of the metallic additive. In some embodiments, the pigment acts as a colorant agent having magnetic properties that triggers the metal detector.

In some embodiments, the surfactant in the metallic additive includes sodium dodecylbenzene sulphonate (SDBS), potassium laurate, monosodium salt of sulphated methyl oleate, sodium naphthalene formaldehyde sulphonate, disodium n-octadecylsulphosuccinamate, sodium polyacrylate, ammonium polyacrylate, glycerol or combinations thereof. In some embodiments, the surfactant in the metallic additive is sodium naphthalene formaldehyde sulphonate. In some embodiments, the surfactant is used in an amount ranging from 20% to 60%, preferably ranging from 30% to 50%, by weight of the metallic additive.

In some embodiments, the solvent in the metallic additive includes tap water, distilled water or combination thereof. In some embodiments, the solvent in the metallic additive is tap water. In some embodiments, the solvent is used in an amount ranging from 10% to 30%, preferably ranging from 15% to 25%, by weight of the metallic additive.

Chemical components with different base polymers (i.e. NBR, hybrid of NBR/CR and NR) are mixed to prepare several exemplary latex formulation in the proportion as seen in Tables 1 to 3 respectively.

TABLE 1

Latex formulation used for an exemplary glove with NBR as base polymer

| Chemicals | Working range (phr) | Preferred range (phr) | Exemplary Dosage (phr) |
|---|---|---|---|
| NBR | 100 | 100 | 100 |
| Potassium hydroxide | 0.50 to 3.00 | 0.60 to 2.90 | 1.60 |
| Zinc oxide | 0.50 to 2.00 | 0.60 to 1.90 | 1.70 |
| Ammonia | 0.10 to 1.00 | 0.20 to 0.90 | 0.40 |
| Mixture of ZDEC and ZDBC | 0.10 to 2.00 | 0.20 to 1.90 | 0.90 |
| Sulphur | 0.50 to 2.00 | 0.60 to 1.90 | 1.50 |
| Ammonium polyacrylate | 0.05 to 0.50 | 0.10 to 0.40 | 0.20 |
| Paraffin wax | 0.10 to 0.50 | 0.15 to 0.45 | 0.30 |
| Titanium dioxide | 0.50 to 1.50 | 0.60 to 1.45 | 1.10 |
| SDBS | 0.10 to 1.00 | 0.15 to 0.90 | 0.60 |
| Silicone or silicone emulsion | 0.01 to 0.09 | 0.02 to 0.08 | 0.04 |

TABLE 1-continued

Latex formulation used for an exemplary glove with NBR as base polymer

| Chemicals | Working range (phr) | Preferred range (phr) | Exemplary Dosage (phr) |
| --- | --- | --- | --- |
| Sodium salt of an acrylic polymer and sodium naphthalene formaldehyde sulphonate | 0.10 to 1.00 | 0.15 to 0.95 | 0.40 |
| Silicate filler | 1.00 to 10.00 | 1.50 to 9.50 | 5.00 |
| Metallic additive according to the instant specification | 10.00 to 25.00 | 11.00 to 22.00 | 17.00 |
| Black pigment | 0.50 to 2.00 | 0.60 to 1.90 | 1.65 |
| Sodium naphthalene formaldehyde sulphonate | 0.10 to 1.00 | 0.20 to 0.90 | 0.40 |
| Water | used at an amount to adjust total solid content of the latex formulation to be ranging between 10% by weight to 30% by weight | | |

TABLE 2

Latex formulation used for an exemplary glove with hybrid of NBR/CR as base polymer

| Chemicals | Working range (phr) | Preferred range (phr) | Exemplary Dosage (phr) |
| --- | --- | --- | --- |
| NBR | 30 to 80 | 40 to 70 | 50 |
| CR | 30 to 80 | 40 to 70 | 50 |
| Metallic additive according to the instant specification | 10.00 to 25.00 | 11.00 to 22.00 | 17.00 |
| Potassium hydroxide | 0.10 to 1.80 | 0.20 to 1.70 | 1.20 |
| Mixture of ZDEC and ZDBC | 0.10 to 2.00 | 0.20 to 1.90 | 1.20 |
| Ammonium polyacrylate | 0.10 to 0.50 | 0.15 to 0.40 | 0.20 |
| Sulphur | 0.50 to 1.80 | 0.60 to 1.70 | 1.00 |
| Zinc oxide | 0.50 to 2.00 | 0.60 to 1.90 | 1.50 |
| Phenolic antioxidant | 0.50 to 2.00 | 0.60 to 1.90 | 1.20 |
| Titanium dioxide | 0.50 to 3.00 | 0.60 to 2.90 | 2.00 |
| Disodium n-octadecylsulfosuccinamate | 0.10 to 0.70 | 0.20 to 0.60 | 0.30 |
| Monosodium salt of sulfated methyl oleate | 0.10 to 2.00 | 0.15 to 1.90 | 0.50 |
| Silicone emulsion | 0.05 to 0.30 | 0.10 to 0.25 | 0.15 |
| Silicate filler | 1.00 to 8.00 | 1.50 to 7.00 | 3.00 |
| Black pigment | 1.00 to 3.00 | 1.10 to 2.50 | 1.60 |
| Water | used at an amount to adjust total solid content of the latex formulation to be ranging between 10% by weight to 30% by weight | | |

TABLE 3

Latex formulation used for an exemplary glove with NR as base polymer

| Chemicals | Working range (phr) | Preferred range (phr) | Exemplary Dosage (phr) |
| --- | --- | --- | --- |
| NR | 100 | 100 | 100 |
| Metallic additive according to the instant specification | 10.00 to 25.00 | 11.00 to 22.00 | 17.00 |
| Ammonia | 0.10 to 0.70 | 0.15 to 0.60 | 0.20 |
| Mixture of ZDEC and ZDBC | 0.10 to 0.50 | 0.15 to 0.40 | 0.18 |
| Ammonium polyacrylate | 0.10 to 0.50 | 0.15 to 0.40 | 0.20 |
| Sulphur | 0.50 to 2.00 | 0.60 to 1.90 | 1.30 |
| Zinc oxide | 0.30 to 1.00 | 0.40 to 0.90 | 0.45 |
| Phenolic antioxidant | 0.10 to 0.70 | 0.15 to 0.60 | 0.40 |
| Paraffin wax and propylene glycol | 0.10 to 2.00 | 0.20 to 1.90 | 1.00 |
| Sodium napthalene formaldehyde sulphonate | 0.10 to 0.70 | 0.20 to 0.60 | 0.20 |
| Silicone emulsion | 0.01 to 0.08 | 0.02 to 0.07 | 0.05 |
| Silicate filler | 1.00 to 6.00 | 1.50 to 5.00 | 3.00 |
| Calcium carbonate | 25.00 to 50.00 | 35.00 to 49.00 | 46.00 |
| Black pigment | 1.00 to 3.00 | 1.50 to 2.90 | 1.60 |
| Water | used at an amount to adjust total solid content of the latex formulation to be ranging between 10% by weight to 30% by weight | | |

The pigment used in the exemplary metallic additive was tested for differences of particle size obtained from three different stages—before and after milling and after homogenization. Table 4 shows comparison of the particle sizes of pigment.

TABLE 4

Particle sizes of pigment obtained at different stages

| Chemicals | Before milling, μm | | After milling, μm | | After homogenization, μm | |
| --- | --- | --- | --- | --- | --- | --- |
| | D90 | D10 | D90 | D10 | D90 | D10 |
| Pigment | 385.78 | 6.29 | 150.29 | 3.50 | 11.93 | 2.21 |

Based on Table 4, it is evident that the pigment used in the metallic additive has smaller particle size after homogenization, wherein the D90 particle size is 11.93 μm and D10 particle size is 2.21 μm. The terms "D90" and "D10" describe diameter of the particle size, whereby 90% of the distribution has smaller particle size of below 11.93 μm and 10% of the distribution has smaller particle size of below 2.21 μm.

The pigment used in the metallic additive is milled and homogenized to obtain a smaller particle size. The pigment used in the metallic additive with smaller particle sizes is to enhance dispersion process as well as reduce sedimentation rate in dispersion which is favorable in latex compounding process. The latter reduces production of defective gloves as the pigment used in the metallic additive with smaller particle sizes is uniformly distributed during the preparation of latex formulation.

In some embodiments, the glove that is detectable by a metal detector is prepared using latex formulation as disclosed above adopting a method commonly known in the glove manufacturing industry. The method to prepare a glove comprises the steps of:

i. dipping a former into a coagulant solution at a temperature ranging between 55° C. to 60° C. for a time period ranging between 5 seconds to 10 seconds and wherein the coagulant solution is any conventional coagulant solution;
ii. drying the coagulant layer coated on the former obtained in step (i);
iii. dipping the former obtained in step (ii) into a first dipping tank containing first or second latex formulation, wherein the first latex layer has a total solid content ranging between 10% by weight to 15% by weight;
iv. drying the first latex layer coated on the former obtained in step (iii);
v. dipping the former obtained in step (iv) into a second dipping tank containing first or second latex formulation, wherein the second latex layer has a total solid content ranging between 10% by weight to 15% by weight;
vi. drying the second latex layer coated on the former obtained in step (v);
vii. treating the second latex layer coated on the former obtained in step (vi) with hot water at a temperature ranging between 50° C. to 70° C. to leach out chemical residues to form pre-leached latex film;
viii. curing the pre-leached latex film coated on the former obtained in step (vii) at a temperature ranging between 100° C. to 140° C. to produce latex film;
ix. treating the latex film coated on the former obtained in step (viii) with chlorine water at an ambient temperature for a time period ranging between 10 seconds to 45 seconds to obtain treated latex film;
x. treating the treated latex film obtained in step (ix) with hot water at a temperature ranging between 50° C. to 70° C. to leach out chemical residues to obtain post-leached latex film;
xi. drying the post-leached latex film coated on the former obtained in step (x) to produce a glove detectable by a metal detector; and
xii. stripping the glove detectable by a metal detector obtained in step (xi) from the former for donning wherein the first and the second latex formulation are identical latex formulation, which was disclosed above.

Color of the prepared glove is also tested to differentiate the color between the two sets of gloves using colorimeter. Tables 5 to 7 show comparison of the color of the exemplary gloves made with different base polymers (i.e. NBR, hybrid of NBR/CR and NR), as well as a corresponding conventional glove that acts as control. The a* value indicates the color level of green and red, the b* value indicates the color level of yellow and blue, the L* value indicates the lightness of the color and the Delta E value indicates the color differences. The lower the L* value, the darker the color of glove detected.

TABLE 5

Comparison of color of the exemplary NBR glove and a conventional NBR glove

| Sample | L* | a* | b* | Delta E |
|---|---|---|---|---|
| Conventional NBR glove | 94.55 | −0.77 | 4.95 | N/A |
| Exemplary NBR glove | 33.23 | 1.05 | 2.77 | 61.76 |

Based on the results obtained in Table 5, it shows that the color of two gloves is not matched, which is observable from the values of L*, a*, b* and Delta E. The L* values objectively show that the exemplary NBR glove is darker in color over the conventional NBR glove. Hence, it is apparent that the NBR glove according to the instant specification is able to reduce dosage of black pigment which is favorable.

TABLE 6

Comparison of color of the exemplary hybrid of NBR/CR glove and conventional hybrid of NBR/CR glove

| Sample | L* | a* | b* | Delta E |
|---|---|---|---|---|
| Conventional hybrid of NBR/CR glove | 94.59 | −0.68 | 1.18 | N/A |
| Exemplary Hybrid of NBR/CR glove | 26.25 | 0.10 | 1.18 | 68.34 |

Based on the results obtained in Table 6, it shows that the color of two gloves is not matched, which is observable from the values of L*, a*, b* and Delta E. The L* values objectively show that the exemplary hybrid of NBR/CR glove is darker in color as compared to the conventional hybrid of NBR/CR glove. Hence, it is proven that the exemplary hybrid of NBR/CR glove with the incorporation of iron oxide pigment is able to reduce dosage of black pigment which is favorable.

TABLE 7

Comparison of color of the exemplary NR glove and a conventional NR glove

| Sample | L* | a* | b* | Delta E |
|---|---|---|---|---|
| Conventional NR glove | 94.66 | −0.67 | 4.62 | N/A |
| Exemplary NR glove | 39.58 | 1.19 | 4.41 | 54.96 |

Based on the results obtained in Table 7, it shows that the color of two gloves is not matched, which is observable from the values of L*, a*, b* and Delta E. The L* values objectively show that the exemplary NR glove is darker in color over the conventional NR glove. Hence, it is apparent that NR glove according to the instant specification is able to reduce dosage of black pigment which is favorable.

Metal detection testing on glove is done to analyze the minimum thickness and frequency that can be achieved by incorporating the iron oxide pigment into the latex formulation. Based on the testing, it is deduced that the metal detector used is able to detect the glove according to the instant specification with fragment size as minimum as 5 mm×5 mm at a high frequency, typically ranging between 800 kHz to 1 MHz with setting the digital gain at 10.6 and the phase angel at 60°.

Even at low and medium frequencies, which is typically ranging between 50 kHz to 600 kHz the glove is able to be detected by metal detector which in turn is desired in detecting contamination in food and beverages industries. The glove according to the instant specification shows that incorporating iron oxide pigment in the latex formulation displays that the glove is able to achieve metal detectability for a minimum fragment size of 5 mm×5 mm.

Mechanical properties such as tensile strength, elongation at break and modulus at 500% of the glove prepared according to the instant specification and the conventional glove without iron oxide pigment are tested according to standard method ASTM D6319, D6977 and D3578. Tables 8 to 10 show comparison of the mechanical properties of the exemplary gloves of the instant specification with different base polymers (i.e. NBR, hybrid of NBR/CR and NR) and corresponding conventional gloves that act as controls.

TABLE 8

Comparison of mechanical properties of the exemplary NBR glove and a conventional NBR glove

| Set | Tensile strength, MPa | | Elongation at break, % | | Modulus at 500%, MPa | |
|---|---|---|---|---|---|---|
| | Before aging | *After aging | Before aging | *After aging | Before Aging | *After aging |
| Conventional NBR glove | 25.63 | 30.10 | 598.7 | 448.2 | 16.38 | NIL |
| Exemplary NBR glove | 25.63 | 26.60 | 548.0 | 481.0 | 16.65 | NIL |
| Standards (ASTM D6319) | Min 14 | Min 14 | Min 500 | Min 400 | Not stated | Not stated |

*Aging condition: Heating at a temperature of 100° C. for a period of 22 hours

Based on the results obtained in Table 8, it is apparent that the exemplary NBR glove meets the standard requirements for mechanical properties (i.e. tensile strength, elongation at break and modulus at 500%) for both before and after aging. Hence, it shows that the NBR glove according to the instant specification is able to achieve desired mechanical properties requirements for both before and after aging even when iron oxide pigment is incorporated into latex formulation.

TABLE 9

Comparison of mechanical properties of the exemplary hybrid of NBR/CR glove and a conventional hybrid of NBR/CR glove

| Set | Tensile strength, MPa | | Elongation at break, % | | Modulus at 500%, MPa | |
|---|---|---|---|---|---|---|
| | Before aging | *After aging | Before aging | *After aging | Before aging | *After aging |
| Conventional hybrid of NBR/CR glove | 22.03 | 25.70 | 556 | 475 | 12.83 | NIL |
| Exemplary Hybrid of NBR/CR glove | 17.60 | 20.50 | 580 | 451 | 19.20 | NIL |
| Standards (ASTM D6977) | Min 14 | Min 14 | Min 500 | Min 400 | Not stated | Not stated |

*Aging condition: Heating at a temperature of 100° C. for a period of 22 hours

Based on the outcomes obtained in Table 9, it is evident that the exemplary hybrid of NBR/CR glove meets the standard requirements for mechanical properties (i.e. tensile strength, elongation at break and modulus at 500%) for both before and after aging. Hence, the exemplary hybrid of NBR/CR glove is able to achieve desired mechanical properties requirements for both before and after aging even when iron oxide pigment is incorporated into latex formulation.

TABLE 10

Comparison of mechanical properties of the exemplary NR glove and a conventional NR glove

| Set | Tensile strength, MPa | | Elongation at break, % | | Modulus at 500%, MPa | |
|---|---|---|---|---|---|---|
| | Before aging | *After aging | Before aging | *After aging | Before aging | *After aging |
| Conventional NR glove | 24.3 | 21.0 | 783 | 658 | 5.34 | 5.11 |
| Exemplary NR glove | 22.6 | 20.6 | 767 | 638 | 5.40 | 5.07 |
| Standards (ASTM D3578) | Min 18 | Min 14 | Min 650 | Min 500 | Max 5.5 MPa | Not stated |

*Aging condition: Heating at a temperature of 70° C. for a period of 7 days

Based on the outcomes obtained in Table 10, it is evident that the exemplary NR glove meets the standard requirements for mechanical properties (i.e. tensile strength, elongation at break and modulus at 500%) for both before and after aging. Hence, the exemplary NR glove is able to achieve desired mechanical properties requirements for both before and after aging even when iron oxide pigment is incorporated into latex formulation.

Thickness and force at break of the glove prepared according to the instant specification and the conventional glove without iron oxide pigment are tested according to standard method EN 455.

Tables 11 and 12 show comparison of the thickness and physical property of the exemplary gloves with different base polymers (i.e. NBR and NR) and corresponding conventional gloves that act as controls.

TABLE 11

Comparison of thickness and force at break of the exemplary NBR glove and a conventional NBR glove

| Set | Thickness, mm | | Force at break, N | |
|---|---|---|---|---|
| | Before aging | *After aging | Before aging | *After aging |
| Conventional NBR glove | 0.06 | 0.06 | 5.97 | 6.58 |
| Exemplary NBR glove | 0.06 | 0.06 | 6.44 | 6.83 |
| Standard (EN 455) | Not stated | Not stated | Min 6 | Min 6 |

*Aging condition: Heating at a temperature of 100° C. for a period of 22 hours

Based on the outcome in Table 11, it is noticeable that the exemplary NBR glove is capable to withstand higher force at break for both before and after aging over the conventional NBR glove, whereby proving that the NBR glove according to the instant specification meets the requirement of EN 455 standards. The NBR glove according to the instant specification is able to withstand up to 6.44 N and 6.83 N before and after aging respectively, which reduces the risk of tear during usage. This is favorable for a glove to be used in food and beverages industries.

TABLE 12

Comparison of thickness and physical property of the exemplary NR glove and conventional NR glove

| Set | Thickness, mm | | Force at break, N | |
| --- | --- | --- | --- | --- |
| | Before aging | *After aging | Before aging | *After aging |
| Conventional NR Glove | 0.12 | 0.12 | 10.65 | 8.59 |
| Exemplary NR glove | 0.12 | 0.12 | 10.03 | 8.66 |
| Standard (EN 455) | Not stated | Not stated | Min 6 | Min 6 |

Based on the outcome in Table 12, it is noticeable that the exemplary NR glove meets the requirement of EN 455 standards. This is favorable for a glove to be used in food and beverages industries.

Durability of the glove prepared according to the instant specification and the conventional glove without iron oxide pigment are tested. Table 13 shows comparison of the durability of the exemplary glove according to the instant specification with base polymer of NBR and conventional glove that acts as control.

TABLE 13

Comparison of durability of the exemplary NBR glove and conventional NBR glove

| Samples | Cycles | Time (minutes) |
| --- | --- | --- |
| Conventional NBR glove | 3904 | 293 |
| Exemplary NBR glove | 5052 | 387 |

Based on the outcome in Table 13, it is apparent that the exemplary NBR glove according to the instant specification achieves higher durability cycles and time taken to complete the durability cycles over the conventional NBR glove. The higher the durability cycles and the time taken to complete the durability cycles, the better the durability of a glove. Having said the above, it is proven that the exemplary NBR glove according to the instant specification is more durable over the conventional NBR glove.

The glove prepared according to the instant specification and the conventional glove without iron oxide pigment were tested under the European Regulation (EU) No. 10/2011 for Overall Migration Testing (OMT) to determine the amount of chemical substances transferred from the glove to foodstuff by using both acetic acid (3%) and ethanol (50%). Tables 14 to 16 show comparison of the OMT of the glove according to the instant specification with different base polymers (i.e. NBR, hybrid of NBR/CR and NR) and corresponding conventional glove that acts as control.

TABLE 14

Comparison of OMT of the exemplary NBR glove according to the instant specification and conventional NBR glove

| Set | OMT (mg/dm$^3$) | |
| --- | --- | --- |
| | Ethanol | Acetic Acid |
| Conventional NBR glove | 29.9 | 33.3 |
| Exemplary NBR glove | 5.5 | 6.8 |
| Specification | <10 | |

Based on the outcome in Table 14, the NBR glove according to the instant specification shows better result as compared to the conventional NBR glove. The NBR glove according to the instant specification meets the standards for both ethanol and acetic acid, while in contrast, the conventional NBR glove failed to meet the required standard passing limit for ethanol and acetic acid. Hence, the results show that the NBR glove according to the instant specification is as required by European Regulation (EU) No. 10/2011.

TABLE 15

Comparison of OMT of the hybrid of the exemplary NBR/CR glove according to the instant specification and conventional hybrid of NBR/CR glove

| Set | OMT (mg/dm$^3$) | |
| --- | --- | --- |
| | Ethanol | Acetic Acid |
| Conventional hybrid of NBR/CR glove | 4.16 | 7.56 |
| Exemplary Hybrid of NBR/CR glove | 9.47 | 8.56 |
| Specification | <10 | |

Based on the outcome in Table 15, the hybrid of NBR/CR glove according to the instant specification shows comparable result as compared to the conventional hybrid of NBR/CR glove. The hybrid of NBR/CR glove according to the instant specification meets the standards for both ethanol and acetic acid. Hence, the results show that the hybrid of NBR/CR glove according to the instant specification is as required by European Regulation (EU) No. 10/2011.

TABLE 16

Comparison of OMT of the exemplary NR glove according to the instant specification and conventional NR glove

| Set | OMT (mg/dm$^3$) | |
| --- | --- | --- |
| | Ethanol | Acetic Acid |
| Conventional NR glove | 2.7 | 7.9 |
| Exemplary NR glove | 3.6 | 6.9 |
| Specification | <10 | |

Based on the outcome in Table 16, the NR glove according to the instant specification shows comparable results as the conventional NR glove. The NR glove according to the instant specification meets the standards for both ethanol and acetic acid comparable with the conventional NR glove. Hence, the results show that the NR glove according to the instant specification is as required by European Regulation (EU) No. 10/2011.

The glove prepared according to the instant specification and the conventional glove without iron oxide pigment are tested under the Japan External Trade Organization (JETRO) Enforcement of the Food Sanitation Act for Overall Migration Testing (OMT) to determine the amount chemical substances transferred from fragment cut (square, 5 cm×5 cm) to foodstuff by using both acetic acid (4%) and ethanol (20%). Tables 17 to 19 show the outcome of OMT for the glove according to the instant specification with different base polymers (i.e. NBR, hybrid of NBR/CR and NR) and corresponding conventional glove that acts as control.

TABLE 17

Outcome of OMT for the exemplary NBR glove according to the instant specification and conventional NBR glove

| | OMT (μg/mL) | |
|---|---|---|
| Set | Ethanol | Acetic Acid |
| Conventional NBR glove | 57.0 | 130.0 |
| Exemplary NBR glove | 6.5 | 23.0 |
| Specification | <60 | |

Based on the results obtained in Table 17, it shows that the NBR glove according to the instant specification passes the requirement set by JETRO for both ethanol and acetic acid which is in contrast to the conventional NBR glove that is able to pass only for ethanol and not acetic acid. This shows that NBR glove according to the instant specification is able to be used in food and beverages industries as it fulfill the requirement standard set by JETRO.

TABLE 18

Outcome of OMT for the exemplary hybrid of NBR/CR glove according to the instant specification and conventional hybrid of NBR/CR glove

| | OMT (μg/mL) | |
|---|---|---|
| Set | Ethanol | Acetic Acid |
| Conventional hybrid of NBR/CR glove | 6.5 | 23.0 |
| Exemplary Hybrid of NBR/CR glove | 39.5 | 34.5 |
| Specification | <60 | |

Based on the results obtained in Table 18, it shows that the hybrid of NBR/CR glove according to the instant specification passes the requirement set by JETRO for both ethanol and acetic acid and comparable with conventional hybrid of NBR/CR glove. This shows that hybrid of NBR/CR glove according to the instant specification is able to be used in food and beverages industries as it fulfill the requirement standard set by JETRO.

TABLE 19

Outcome of OMT for the exemplary NR glove according to the instant specification and conventional NR glove

| | OMT (μg/mL) | |
|---|---|---|
| Set | Ethanol | Acetic Acid |
| Conventional NR glove | 1.5 | 56.7 |
| Exemplary NR glove | 11.5 | 54.9 |
| Specification | <60 | |

Based on the results obtained in Table 19, it shows that the NR glove according to the instant specification passes the requirement set by JETRO for both ethanol and acetic acid which is comparable with conventional NR glove. This shows that NR glove according to the instant specification is able to be used in food and beverages industries as it fulfill the requirement standard set by JETRO.

As a whole, the glove that is detectable by a metal detector according to the instant specification is able to overcome the conventional shortcomings since the glove prepared according to the instant specification with incorporation of iron oxide pigment in the latex formulation improves the metal detectability of the glove. Further, the glove according to the instant specification proves that it is safe to be in the food and beverages industries, as well as, meets all the standard requirements for mechanical properties and durability of the glove.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises", "comprising", "including" and "having" are inclusive and therefore specify the presence of stated features, integers, steps, operations, elements and/or components, but do not preclude the presence or addition of one or more other features, integers, steps, operations, elements, components and/or groups thereof.

The method, steps, processes and operations described herein are not to be construed as necessarily requiring their performance in the particular order discussed or illustrated, unless specifically identified as an order of performance. It is also to be understood that additional or alternative steps may be employed. The use of the expression "at least" or "at least one" suggests the use of one or more elements, as the use may be in one of the embodiments to achieve one or more of the desired objects or results.

What is claimed is:

1. A glove that is detectable by a metal detector, wherein the glove is prepared from a latex formulation comprising:
    a base polymer;
    a pH adjuster;
    an accelerator;
    a vulcanizing agent;
    a thickener;
    an antitack agent;
    a whitening agent;
    a stabilizer;
    an antifoaming agent;
    an antioxidant;
    a dispersing agent;
    a filler;
    a black pigment;
    a surfactant;
    water; and
    a metallic additive,
    wherein the metallic additive comprises a pigment, a surfactant, and a solvent,
    wherein the pigment in the metallic additive is at least one selected from the group consisting of iron oxide pigment, iron oxide pigment with water-based source, iron oxide pigment linked zinc, and combinations thereof,
    wherein the surfactant in the metallic additive is at least one selected from the group consisting of sodium dodecylbenzene sulphonate, potassium laurate, monosodium salt of sulphated methyl oleate, sodium naphthalene formaldehyde sulphonate, disodium n-octadecylsulphosuccinamate, sodium polyacrylate, ammonium polyacrylate, glycerol, and combinations thereof,
    wherein the solvent is at least one selected from the group consisting of tap water, distilled water, and a combination thereof,
    wherein an amount of the metallic additive is 10 phr or more of the latex formulation, and
    wherein a 90% distribution of particle diameter (D90) of the pigment is less than 11.93 μm and a 10% distribution of particle diameter (D10) of the pigment is less than 2.21 μm.

2. The glove of claim 1, wherein the amount of the metallic additive ranges from 10.00 phr to 25.00 phr of the latex formulation.

3. The glove of claim 1, wherein a total solid content of the metallic additive ranges from 10% to 30%.

4. The glove of claim 1, wherein an amount of the pigment ranges from 20% to 60% based on a weight of the metallic additive.

5. The glove of claim 1, wherein an amount of the surfactant ranges from 20% to 60% based on a weight of the metallic additive.

6. The glove of claim 1, wherein an amount of the solvent ranges from 10% to 30% based on a weight of the metallic additive.

7. The glove of claim 1, wherein the glove is detectable by a metal detector when a thickness of the glove is 0.05 mm or more.

* * * * *